US011206242B2

(12) United States Patent
Tummalapenta et al.

(10) Patent No.: US 11,206,242 B2
(45) Date of Patent: Dec. 21, 2021

(54) SECURE COMMUNICATION TUNNELS SPECIFIC TO NETWORK RESOURCE

(71) Applicant: International Business Machines Corporation, Armonk, NY (US)

(72) Inventors: Srinivas B. Tummalapenta, Broomfield, CO (US); Nikhilkumar V. Shah, Bear, DE (US); Adam L. Griffin, Dubuque, IA (US); HuyAnh D. Ngo, Sterling Heighls, MI (US); Paul A. Ragone, Winter Garden, FL (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 16/256,004

(22) Filed: Jan. 24, 2019

(65) Prior Publication Data

US 2020/0244625 A1    Jul. 30, 2020

(51) Int. Cl.
| | |
|---|---|
| *G06F 21/60* | (2013.01) |
| *H04L 9/12* | (2006.01) |
| *H04L 29/06* | (2006.01) |
| *H04L 29/08* | (2006.01) |
| *H04L 12/46* | (2006.01) |
| *G06F 21/71* | (2013.01) |

(52) U.S. Cl.
CPC ...... *H04L 63/0272* (2013.01); *H04L 12/4633* (2013.01); *H04L 12/4641* (2013.01); *H04L 63/0236* (2013.01); *H04L 63/1416* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 6,694,437 | B1 | 2/2004 | Pao et al. |
| 6,915,436 | B1 | 7/2005 | Booth et al. |
| 7,369,556 | B1 | 5/2008 | Rekhter et al. |
| 7,389,534 | B1 | 6/2008 | He |
| 9,164,795 | B1 * | 10/2015 | Vincent ............... H04L 12/4633 |
| 2005/0091355 | A1 | 4/2005 | Keohane et al. |

(Continued)

OTHER PUBLICATIONS

Simple-fying Middlebox Policy Enforcement Using SDN.Qazi. SIGCOMM (Year: 2013).*

(Continued)

*Primary Examiner* — Venkat Perungavoor
(74) *Attorney, Agent, or Firm* — VanLeeuwen & VanLeeuwen; Jeffrey S. LaBaw (57) ABSTRACT

An approach is disclosed that receives a request from a first device connected to a first network to connect to a second device connected to a second network. In response to verifying that a connection between the first device and the second device is allowed, the approach operates to establish a secure network communications tunnel between the first device and the second device. The secure network communications tunnel is specific to the first and second devices and the first device is inhibited from accessing other devices that are connected to the second network using the secure network communications tunnel. The secure network communications tunnel is then terminated in response to a detection of a security event.

20 Claims, 7 Drawing Sheets

(56) References Cited

U.S. PATENT DOCUMENTS

| | | |
|---|---|---|
| 2008/0209224 A1 | 8/2008 | Lord |
| 2011/0055299 A1 | 3/2011 | Phillips |
| 2013/0182712 A1 | 7/2013 | Aguayo et al. |
| 2013/0290716 A1* | 10/2013 | Gavrilov ............. H04L 63/0471 713/168 |
| 2016/0125422 A1* | 5/2016 | Blanco .................. G06Q 40/08 705/4 |
| 2017/0237601 A1* | 8/2017 | Zhu ..................... H04L 41/0233 709/223 |
| 2021/0022197 A1* | 1/2021 | Chiang .................. H04L 65/80 |

OTHER PUBLICATIONS

Taxonomy of Conflicts in Network Security Policies. Hamed. IEEE. (Year: 2006).*

Policy-Based Dynamic Provision of IP Services in a Secure VPN Coalition Scenario. Perez. IEEE. (Year: 2004).*

Site-to-Site VPN Technologies: A Survey. Rathore. (Year: 2009).*

"Cloud VPN Gateway—Cloud-enabled VPN Tunnel Termination," Aerohive Networks, Inc., publication date unknown, downloaded May 2018, 2 pages.

"Cisco AnyConnect Secure Mobility Client," Cisco, publication date unknown, downloaded May 2018, 9 pages.

"Which VPN? Applications for IPsec and MPLS," AT&T, Mar. 2016, 2 pages.

Eddy, "Avast Secureline VPN," PCMag.com, Aug. 2017, 11 pages.

* cited by examiner

SECURE COMMUNICATION TUNNELS SPECIFIC TO NETWORK RESOURCE

BACKGROUND

A virtual private network (VPN) extends a private network across a public network. VPNs enable users to send and receive data across shared or public networks as if their computing devices were directly connected to the private network. Applications running across a VPN may therefore benefit from the functionality, security, and management of the private network. VPNs were developed to allow remote users access to an organization's applications and network resources. A private network connection is established using an encrypted layered tunneling protocol to secure the network from non-authorized users. VPN users use authentication methods, including passwords or certificates, to gain access to the VPN. A VPN is created by establishing a virtual point-to-point connection through the use of dedicated connections, virtual tunneling protocols, or traffic encryption. A VPN available from the public Internet can provide some of the benefits of a wide area network (WAN). From a user perspective, the resources available within the private network can be accessed remotely.

SUMMARY

An approach is disclosed that receives a request from a first device connected to a first network to connect to a second device connected to a second network. In response to verifying that a connection between the first device and the second device is allowed, the approach operates to establish a secure network communications tunnel between the first device and the second device. The secure network communications tunnel is specific to the first and second devices and the first device is inhibited from accessing other devices that are connected to the second network using the secure network communications tunnel. The secure network communications tunnel is then terminated in response to a detection of a security event.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-7 describe an approach that provides a next generation secure network communications tunnel that has enhanced security, authentication, and protection mythologies built into the tunneling infrastructure. The secure network communications tunnel terminates, or self-destructs, at the end of a session or when a possible threat is detected. The secure network communications tunnel establishes a connection from the user's device to another device in the organization's private network without giving the user's device access to all of the devices and resources connected to the organization's network.

For example, an end user accesses a secure resource that is accessible from an organization's private (secure) network requests on on-demand secure network communications tunnel and provides requested authentication information (e.g., user identifier, password, biometric data, etc.). Upon validation, a secure network communications tunnel is established between the user's device and the particular network resource that is being requested. For a simplified example, suppose the organization's private network has a payroll system, an accounts receivable system, and an accounts payable system. A user has been granted access to the accounts payable system as part of the user's job requirements and credentials have been established giving the user access to the accounts payable system. When the user accesses the accounts payable system from outside the organization's network (e.g., from the user' home, etc.), then a secure network communications tunnel is established between the user's device (e.g., home computer system, etc.) and the requested device (the accounts payable system). The secure network communications tunnel is established between these two systems and does not allow the user to access other devices or resources with the organization's network (e.g., access is inhibited between the user's device and both the accounts receivable system and the payroll system as the secure network communications tunnel is only to the specific device hosting the accounts payable system). In one embodiment, expected user behaviors are captured as part of a user's profile. The expected user behaviors (e.g., work schedule, work locations, etc.) are compared to the current user's behavior and, if discrepancies are found the secure network communications tunnel can be terminated or denied altogether. In addition, when the user terminates or otherwise stops the session with the authorized system, in this case the accounts payable system, the system terminates the secure network communications tunnel. Finally, if any intrusion attempts are detected from the user's device, such as the user attempting to use the secure network communications tunnel to access other non-authorized devices or resources, the system can terminate the secure network communications tunnel. In addition, the tunnel can be terminated if a detection is made that a third party is attempting to use the secure network communications tunnel.

High risk geographic areas can be identified with policies established to reject or terminate secure network communications tunnels from such areas (e.g., airports, public transportation centers, Internet cafes, etc.). In one embodiment, the system identifies the ISP location to determine high and low risk areas.

The following use cases provide further examples of how the secure network communications tunnel can be utilized in real-world scenarios. In general, a user requests an secure network communications tunnel to utilize an organizational resource that is available from the organization's private network, such as the user requesting the resource from the user's hotel room after accessing the Internet with the user's laptop computer system. The system verifies the user's credentials and, once verified, establishes a secure network communications tunnel that specifically connects the user's device (laptop) with the requested resource (device available from the organization's private network). The secure network communications tunnel prevents the user from accessing other resources using the secure network communications tunnel. If other resources are desired, additional secure network communications tunnels are established to provide access to such other resources from the user's device.

In a first use case, a user requests access to a server accessible from an organization's private network. The system creates a secure network communications tunnel to connect the user's device (e.g., laptop, etc.) to the server (and only the server). When the user's session with the server is complete, the system terminates the secure network communications tunnel so the server is no longer accessible from the user's device.

In a second use case, the same user as in the first use case requests access to a database management system (DBMS) that is also accessible from the organization's private network. Instead of using the secure network communications tunnel established to access the server, the system establishes a second secure network communications tunnel that is used strictly to allow access to the DBMS from the user's device. Again, when the user's session with the DBMS is complete, the system terminates the secure network communications tunnel so the DBMS is no longer accessible from the user's device.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
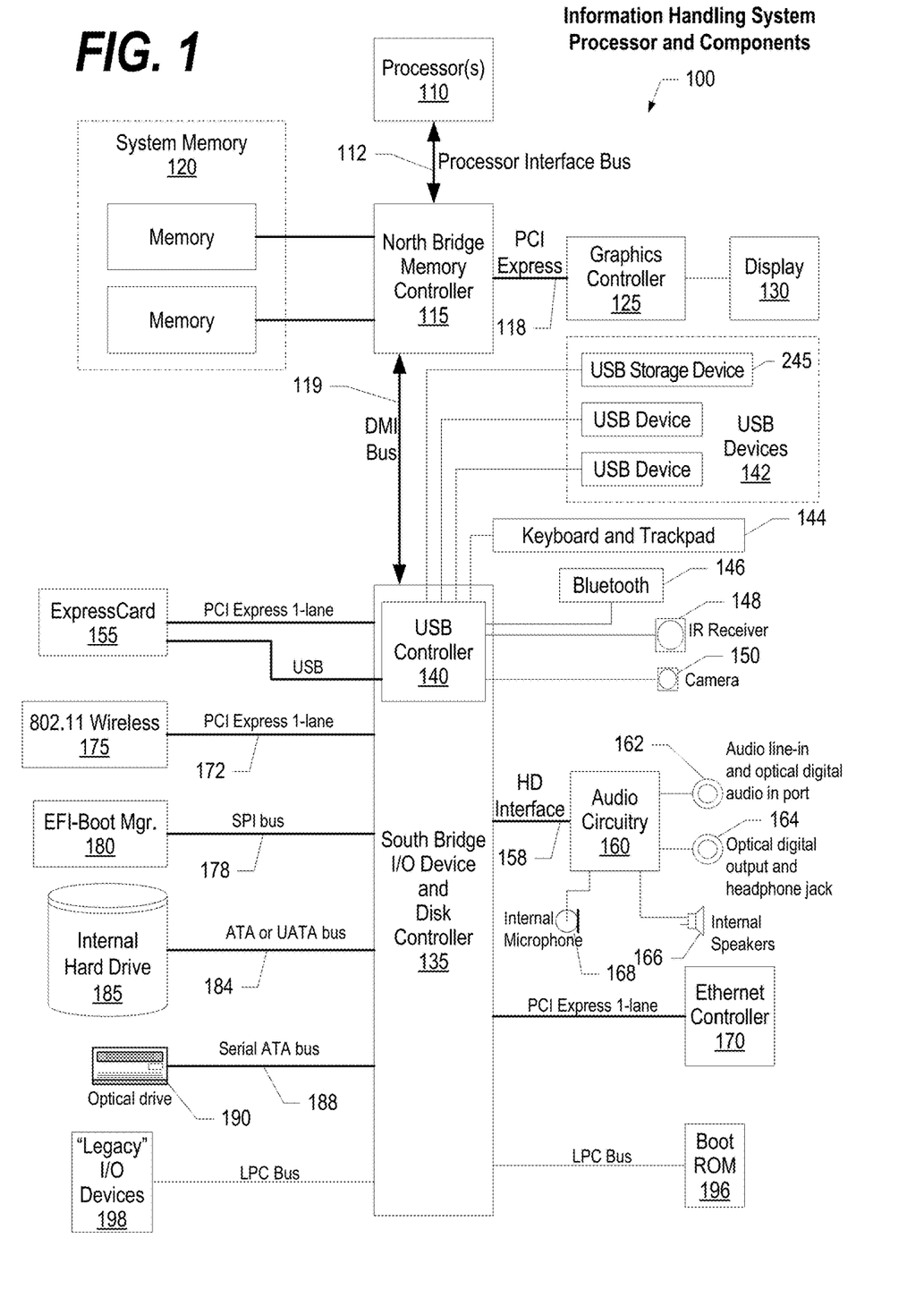
FIG. 1 is a block diagram of a data processing system in which the methods described herein can be implemented.
Figure 2:
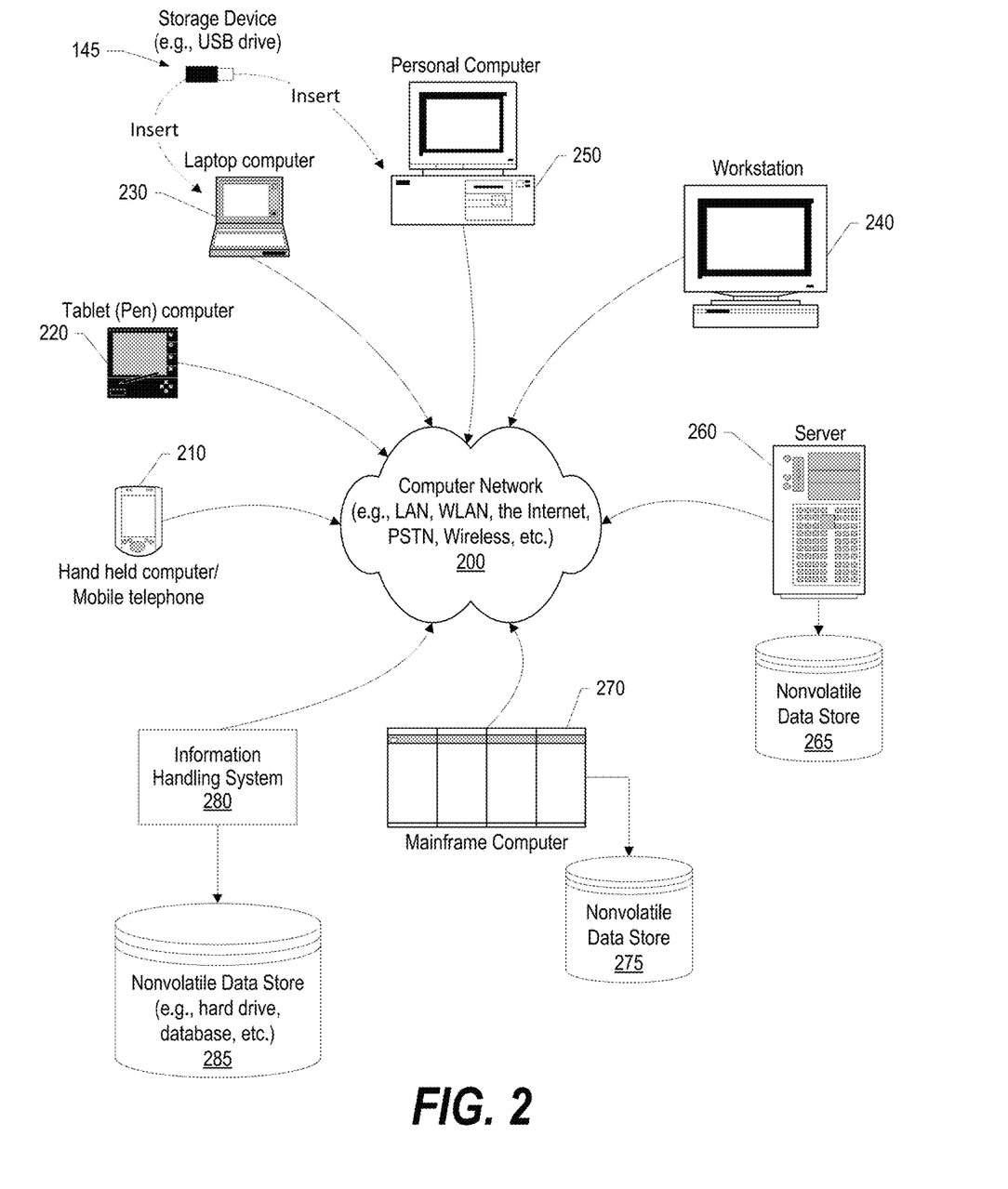
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
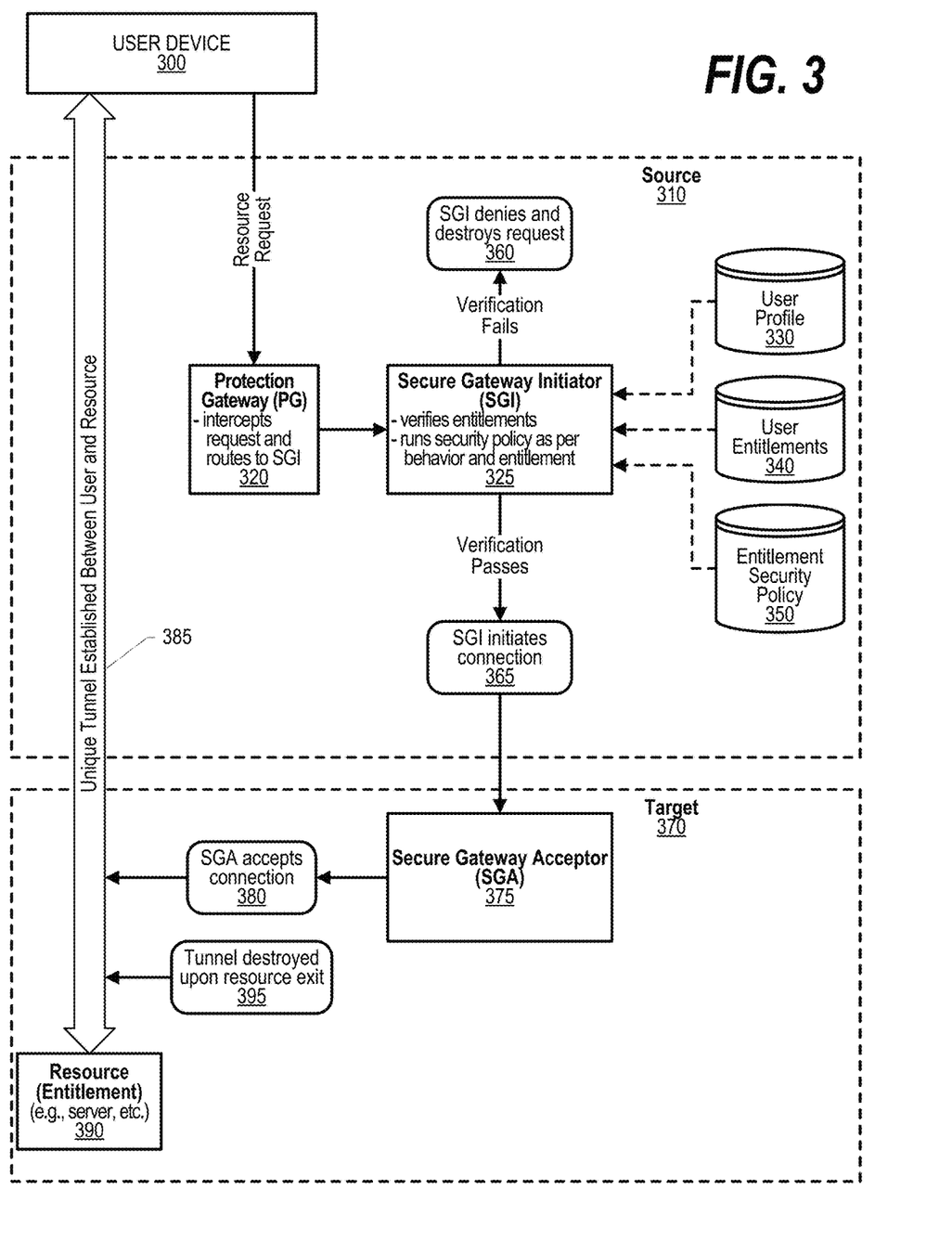
FIG. 3 is a component diagram depicting an approach that secures communication tunnels that are specific to a particular network resource.

FIG. 3 is a component diagram depicting an approach that secures communication tunnels that are specific to a particular network resource. User device 300, such as a laptop computer system or other device being used by an end user, is connected to a first network, such as the Internet, and is requesting a resource that is either a device or hosted on a device that is connected to a second computer network, such as an organization's private network (e.g., LAN, etc.).

The system handling the incoming resource request is shown logically separated into source 310 processing and target 370 processing. Other implementations may combine source and target functionality with the depiction shown in FIG. 3 being one possible implementation approach.

Source 310 processing commences with protection gateway (PG) process 320 that intercepts the incoming request and routes the request to secure gateway initiator (SGI) process 325. Secure gateway process 325 verifies the user's entitlements to resources including the requested resource and further runs one or more security polices that pertain to the user's expected behavior and/or to the entitlement being requested. Process 325 retrieves user data, including the user's expected behaviors, from user profile 330. User entitlements are retrieved from data store 340, and the security policies that pertain to entitlements are retrieved from data store 350.

The result of secure gateway initiator process 325 is either a failed verification in which the SGI denies and destroys the user request at step 360, or a successful verification in which the SGI initiates the connection between the user's device and the device hosting the requested resource at step 365. In cases where verification is successful, source process 310 transfers control and handling of the request to target processing 370.

Target processing 370 is responsible for creating the secure network communications tunnel between the user's device 300 and device 390 that hosts the resource being requested by the user (e.g., a server, an application residing on a server, etc.). At step 380, target processing 370 accepts the connection request and generates secure network communications tunnel 385 between user device 300 and device 390 that hosts the requested resource. Target process 370 monitors activities and usage of secure network communications tunnel 385 by user device 300. At step 395, target processing terminates the secure network communications tunnel when a security event is detected. The security event may be that a session between the user's device and the requested resource has ended, an intrusion attempt, or other security event such as the user's actual behavior in using the requested resource deviating from the user's expected behavior when using the requested resource.

A separate secure network communications tunnel is generated and monitored for each resource requested from user device 300. For example, user device 300 might request a first resource, such as use of an application hosted on a first device, with the system creating a secure network communications tunnel to allow user device 300 to use the first device. The user might also need access to a second device but, rather than utilizing the same secure network communications tunnel, the system creates a second secure network communications tunnel that allows the user to access the second requested device. While an secure network communications tunnel allows user device access to a particular resource (device), access to other resources (devices) is inhibited from the same secure network communications tunnel. Instead, separate secure network communications tunnel are generated pertaining to each of the devices being accessed by the user's device.

Figure 4:
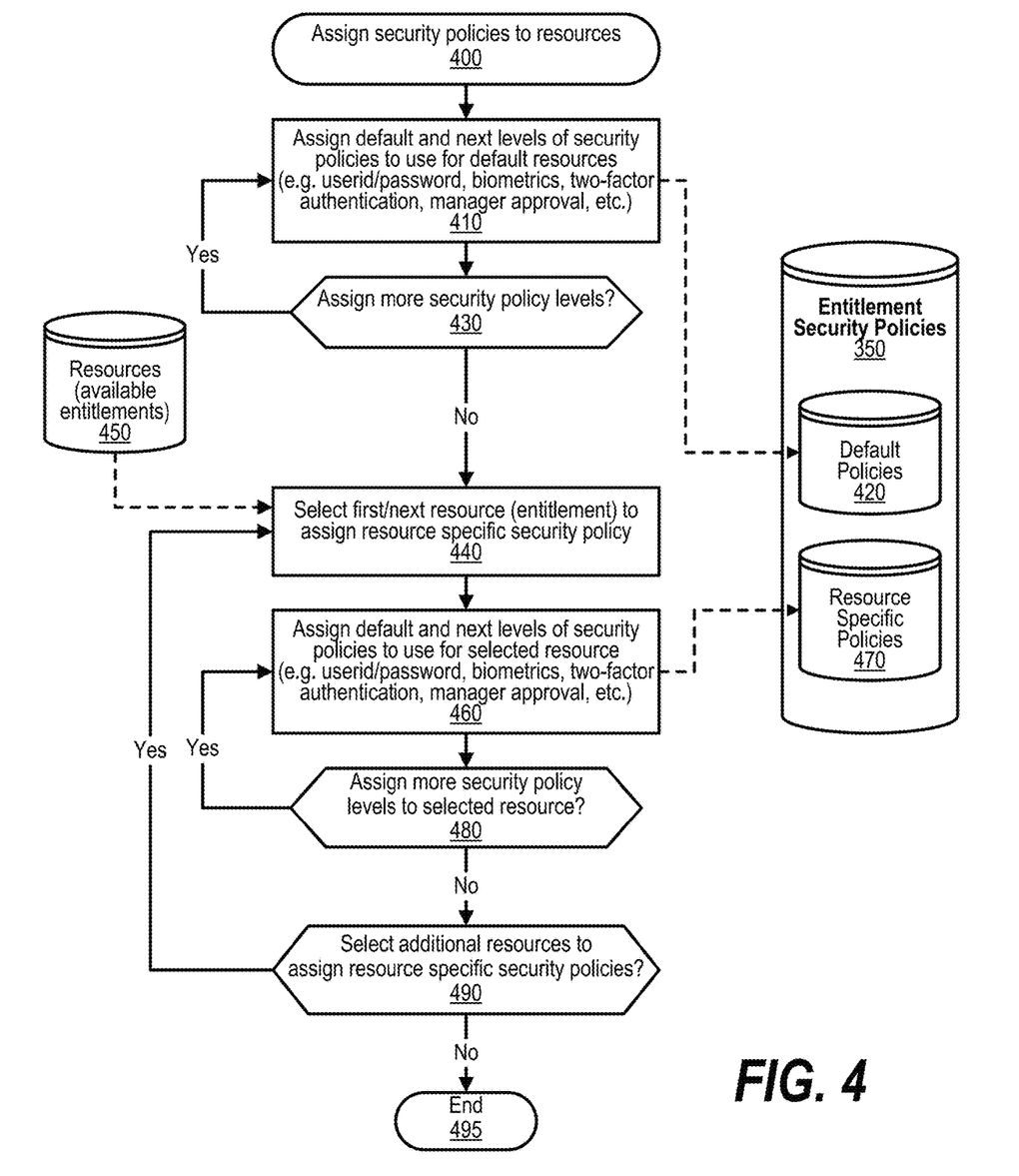
FIG. 4 is a flowchart depicting the assignment of security policies to an organization's network resources.

FIG. 4 is a flowchart depicting the assignment of security policies to an organization's network resources. FIG. 4 processing commences at 400 and shows the steps taken by a process that assigns security policies to resources. At step 410, the process assigns default security policies and other security levels for the security policies that are to be used for default resources. These security policies, such as requiring userid/password, requiring biometrics input, requiring two-factor authentication, requiring manager approval, and the like, are assigned and stored in data store 420 which is a subset of entitlement security polices 350. The process determines as to whether the user, such as a security administrator, wishes to assign more security policy levels (decision 430). If more security policy levels are being assigned, then decision 430 branches to the 'yes' branch which loops back to step 410 to assign the next set of security policies. This looping continues until no further security policy levels are being assigned, at which point decision 430 branches to the 'no' branch exiting the loop.

At step 440, the process selects the first resource (entitlement) to assign a resource specific security policy. The resource is selected from data store 450 which contains a listing of the organization's resources (e.g., servers, systems, database management systems, etc.). At step 460, the process, using the administrator's inputs, assigns the default and next levels of security policies to use for the selected resource. These policies might be to require userid/password, biometrics, two-factor authentication, manager approval, etc. The assigned resource-specific policies are then stored in data store 470 which is also a subset of entitlement security polices 350. The process determines as to whether the administrator wishes to assign more security policy levels to the selected resource (decision 480). If more security policy levels are being assigned to selected resource, then decision 480 branches to the 'yes' branch which loops back to step 460 to assign further policy levels as described above. This looping continues until the user does not wish to assign further policy levels to the resource, at which point decision 480 branches to the 'no' branch exiting the loop.

The process determines as to whether the user wishes to select additional resources to which resource specific security policies are assigned (decision 490). If additional resources are selected, then decision 490 branches to the 'yes' branch which loops back to step 440 for the selection of the next resource which is processed as described above. This looping continues until no more resources are selected, at which point decision 490 branches to the 'no' branch exiting the loop. FIG. 4 processing thereafter ends at 495.

Figure 5:
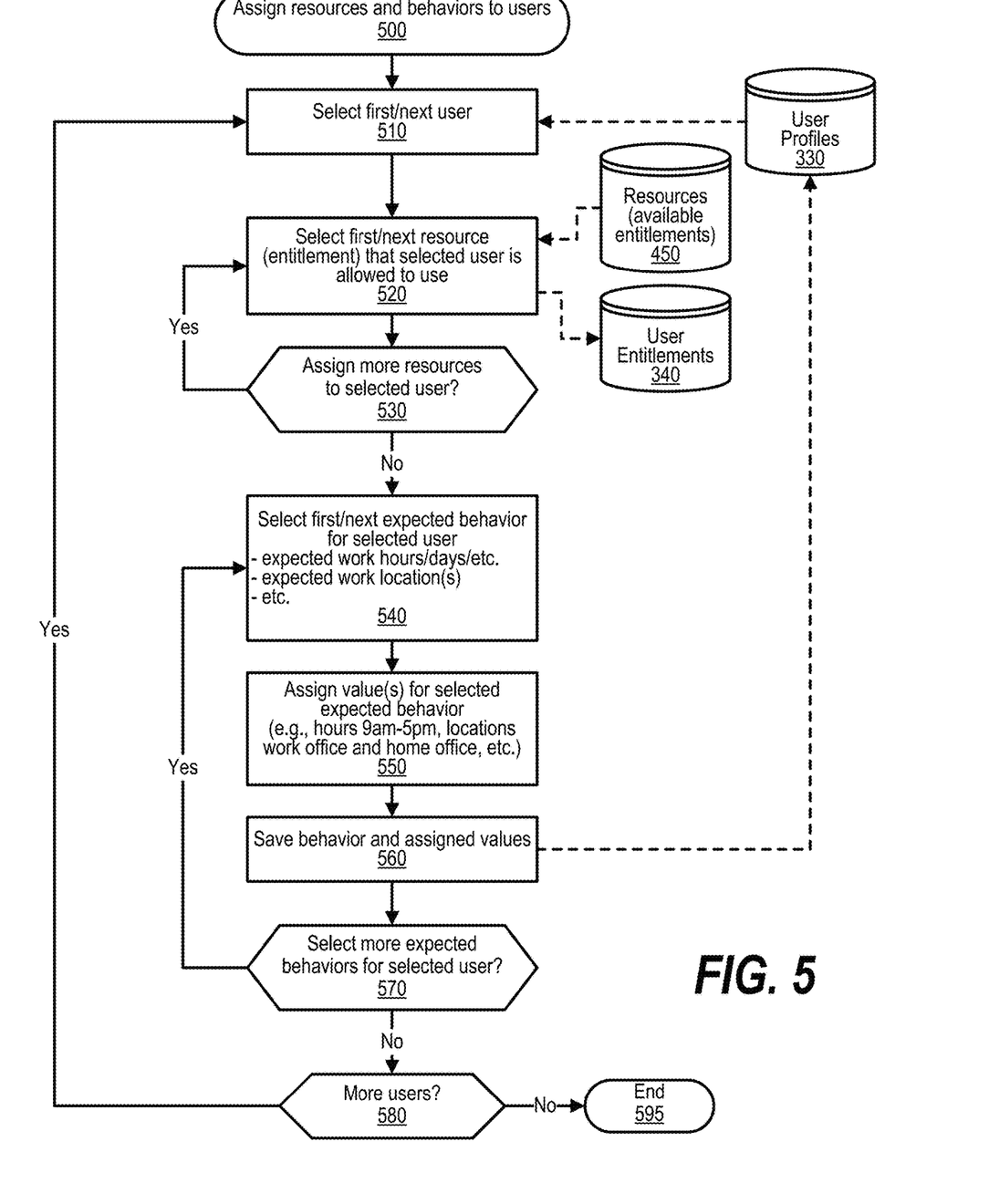
FIG. 5 is a flowchart depicting the assignment of the organization's resources to users and the assignment of expected behaviors of such users.

FIG. 5 is a flowchart depicting the assignment of the organization's resources to users and the assignment of expected behaviors of such users. FIG. 5 processing commences at 500 and shows the steps taken by a process that assigns resources and behaviors to users. At step 510, the process selects the first user. At step 520, the process selects the first resource (entitlement) that the selected user is allowed to use. The resources are selected from data store 450 and the user entitlements are stored in data store 340. For example, the selected user might be allowed to use a particular server, so that server would be selected as an allowed resource. The process determines as to whether the selected user is allowed additional resources that need to be assigned to the user (decision 530). If the selected user is allowed additional resources, then decision 530 branches to the 'yes' branch which loops back to 520 to select the next resource that the user is allowed to use. This looping continues until there are no more resources that the administrator wishes to assign to this user, at which point decision 530 branches to the 'no' branch exiting the loop.

At step 540, the process selects the first expected behavior for the selected user. Expected behaviors might include the expected work hours/days/etc., the user's expected work location(s), and any other expected behaviors for this user when conducting work for the organization. At step 550, the process assigns values for the selected expected behavior. For example, if the behavior is work hours, then the values might be a range from 9 am-5 pm, for locations the expected values might be the selected user's work office and the selected user's home office. Other values are selected for other types of expected behaviors. At step 560, the process saves behavior and assigned values in user profiles data store 330.

The process determines as to whether the administrator wishes to select more expected behaviors for the selected user (decision 570). If the administrator selects more expected behaviors for the selected user, then decision 570 branches to the 'yes' branch which loops back to step 540 to select the next expected behavior to assign to the user. This looping continues until the administrator does not select any more expected behaviors for the selected user, at which point decision 570 branches to the 'no' branch exiting the loop.

The process determines as to whether the administrator is assigning resources and behaviors to additional users in the organization (decision 580). If the administrator is assigning resources and behaviors to additional users in the organization, then decision 580 branches to the 'yes' branch which loops back to step 510 to have the administrator select the next user from data store 330. This looping continues until no more users are selected, at which point decision 580 branches to the 'no' branch exiting the loop. FIG. 5 processing thereafter ends at 595.

Figure 6:
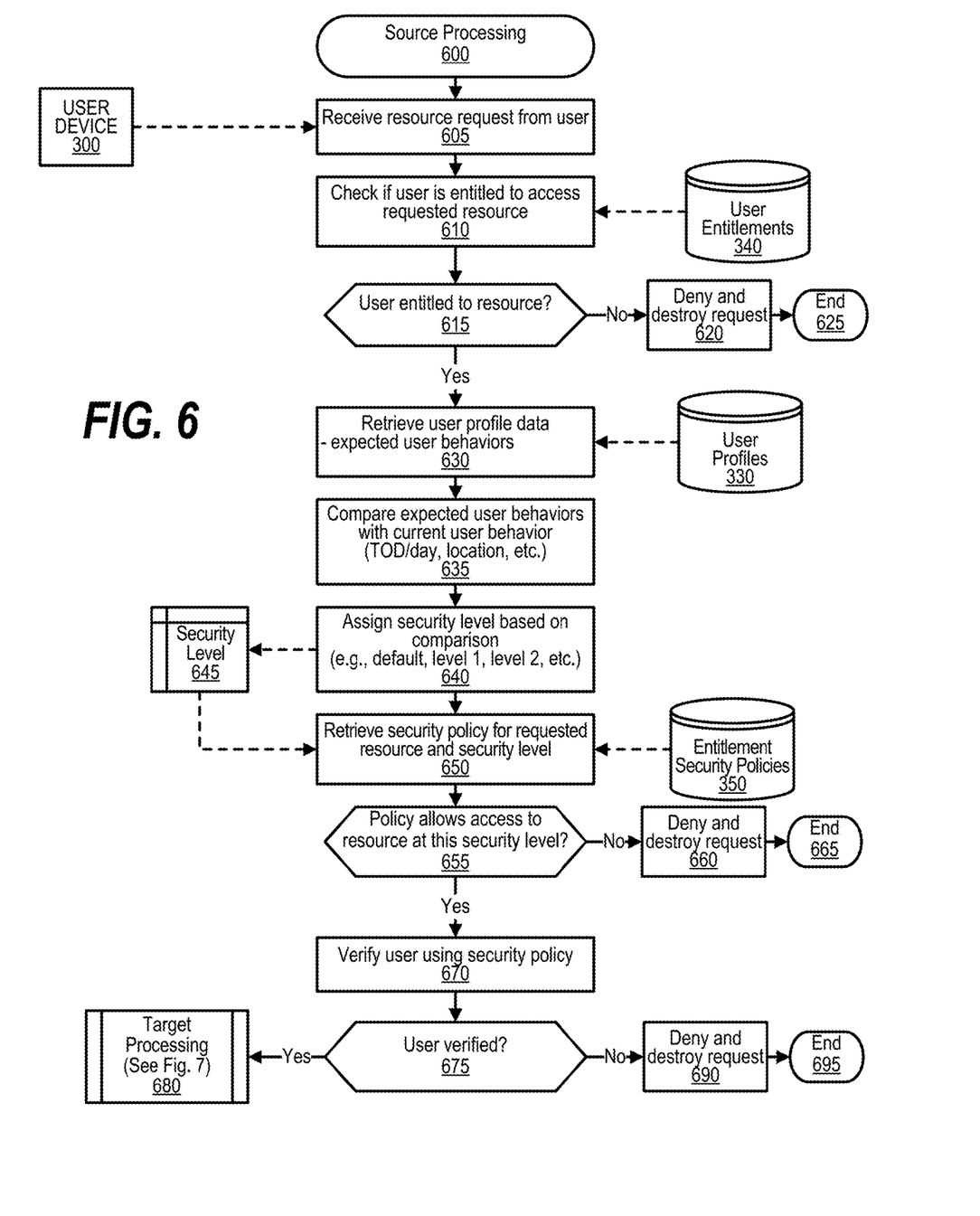
FIG. 6 is a flowchart depicting processing that occurs to process a resource request from a user.

FIG. 6 is a flowchart depicting processing that occurs to process a resource request from a user. FIG. 6 processing commences at 600 and shows the steps taken by a process that performs source processing on an incoming resource request received from a user. At step 605, the process receives the resource request from user 300. Step 605 would also authenticate the user (e.g., receive userid/password, other credentials, etc.). At step 610, the process performs a lookup using user entitlements data store 340 to see if this user is entitled to access the requested resource. Based on the lookup, the process determines whether the user is entitled to access the requested resource (decision 615). If the user is entitled to access the requested resource, then decision 615 branches to the 'yes' branch for further processing described below. On the other hand, if the user is not entitled to access the requested resource, then decision 615 branches to the 'no' branch. whereupon at step 620 the request is denied and destroyed and processing ends at 625.

If the user is entitled to use the requested resource then, at step 630, the process retrieves expected user behaviors from user profile data store 330. At step 635, the process compares this user's expected behaviors with the user's current behaviors. This comparison might be the current time of day and day of the week compared to the user's expected work time of day and day of the week, the current user's location (e.g., hotel in a foreign country, etc.) with the user's expected location (e.g., either work or home office locations), etc. At step 640, the process assigns security level based on comparison (e.g., default, level 1, level 2, etc.). Default might be where there is no discrepancy between the user's current and expected behaviors, level one might be minor discrepancies between the user's current and expected behaviors, and so on. The assigned security level is stored in memory area 645. At step 650, the process retrieves the security policy for the requested resource with the assigned security level. The security policy is retrieved from data store 350 and the assigned security level is retrieved from memory area 645.

For example, for access to a server, the default policy might only require the user's basic credentials (userid/password, etc.), while a first level security policy might require biometric input from the user, and a second level security policy might require both biometric input and two-factor authentication, while a third level security policy might require biometric input, two-factor authentication, and manager approval.

The process determines as to whether the policy allows the user access to the requested resource at this security level (decision 655). For example, a particular resource, such as a payroll system, might forbid any access if the assigned security level is greater than two, etc. If the policy allows access to the resource at this security level, then decision 655 branches to the 'yes' branch. On the other hand, if the policy allows access to the resource at this security level, then decision 655 branches to the 'no' branch whereupon at step 660 the request is denied and destroyed and processing ends at 665.

If the policy allows access to the resource at this security level then, at step 670, the process verifies user using the retrieved security policy. For example, the retrieved security policy might require biometric input, biometric input and two-factor authentication, biometric input, two-factor authentication, and manager approval, etc. The process determines as to whether user verified (decision 675). If the user is verified using the security policy, then decision 675 branches to the 'yes' branch whereupon, at predefined process 680, target processing is performed (see FIG. 7 and corresponding text for processing details). On the other hand, if the user is not verified using the security policy, then decision 675 branches to the 'no' branch whereupon at step 690 the request is denied and destroyed and processing ends at 695.

Figure 7:
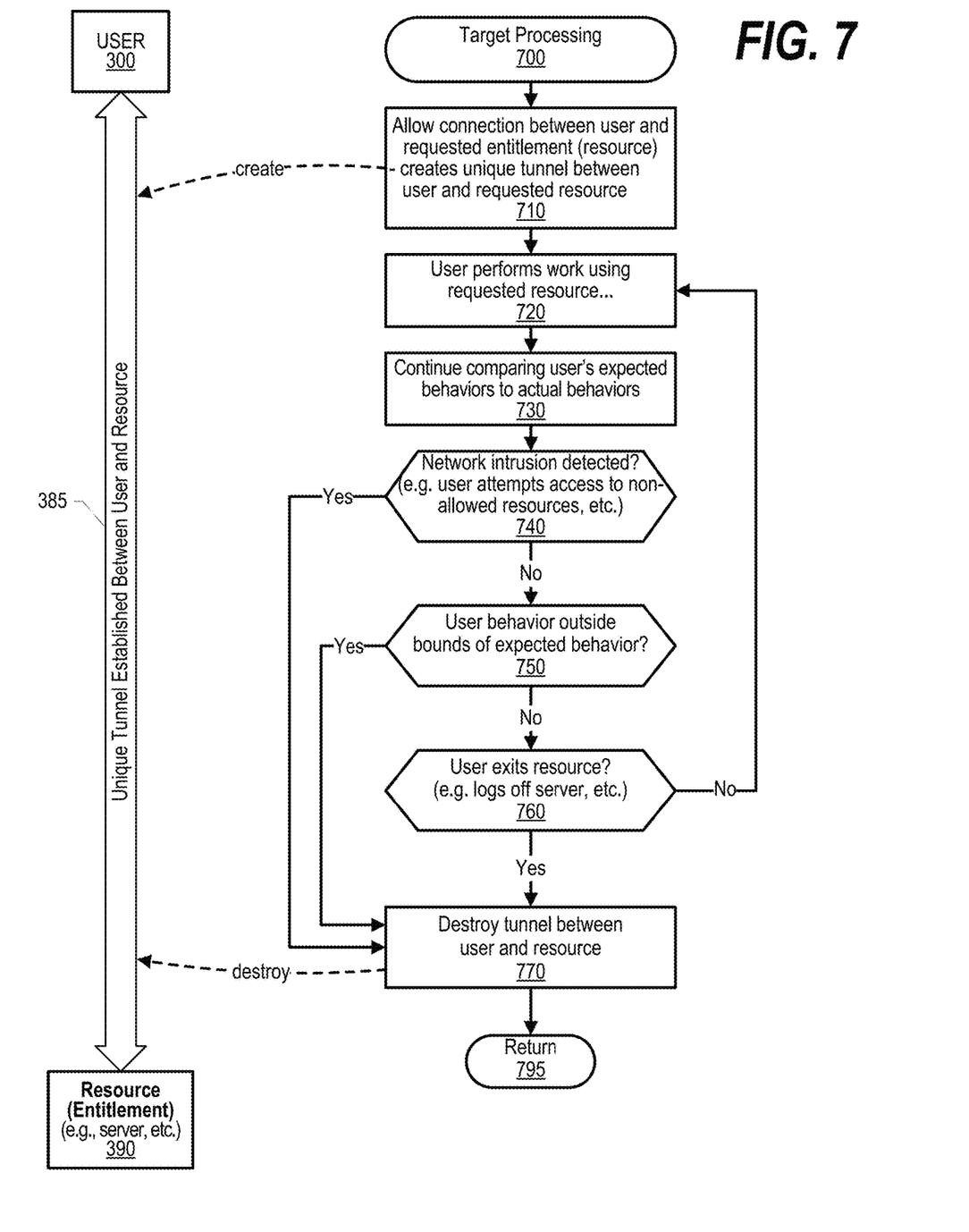
FIG. 7 is a flowchart depicting processing that manages the connection that is made between a user and a particular network resource.

FIG. 7 is a flowchart depicting processing that manages the connection that is made between a user and a particular network resource. FIG. 7 processing commences at 700 and shows the steps taken by a process that performs target processing that manages a secure network communications tunnel that is established between user device 300 and a resource (device) that is accessible within an organization's local area network (LAN). At step 710, the process creates secure network communications tunnel between user device and the requested entitlement (resource) 390. The requested entitlement is a device or hosted on a device accessible within the organization's internal network (LAN). Step 710 creates unique secure network communications tunnel 385 between user device 300 and requested resource device 390. The remaining target processing steps monitor usage of the secure network communications tunnel and destroys the secure network communications tunnel when a security event is detected. One possible security event is the discontinuation of a session that uses the secure network communications tunnel, such as a session between user device 300 and a software system hosted on device 390.

At step 720, the process monitors usage of the secure network communications tunnel while the user performs work using requested resource over the secure network communications tunnel. At step 730, the process continues comparing the user's expected behaviors to the actual behaviors. For example, if the user device is a mobile device, the user might move from one location to another location while accessing resource (device) 390.

The process determines as to whether a network intrusion is detected corresponding to unique secure network communications tunnel created to allow user device 300 to access organization device 390 (decision 740). For example, a third party might be detected as attempting to use or otherwise hijack use of the secure network communications tunnel. In addition, the user might attempt to access other (non-allowed) resources by using established secure network communications tunnel 385. If a network intrusion detected corresponding to secure network communications tunnel 385, then decision 740 branches to the 'yes' branch to destroy the secure network communications tunnel at 770. On the other hand, if a network intrusion is not detected, then decision 740 branches to the 'no' branch for further processing.

The process determines as to whether the user's current behavior is outside the bounds of expected behavior for the user (decision 750). For example, the user memory area have changed locations and moved from the user's home office to an Internet cafe where the security level is high and does not permit the use of the selected resource. If the user behavior is outside the bounds of the expected behavior for this user, then decision 750 branches to the 'yes' branch to destroy the secure network communications tunnel at 770. On the other hand, if the user's behavior is not outside the bounds of the expected behavior for this user, then decision 750 branches to the 'no' branch for further processing.

The process determines as to whether user has ceased use of the resource (decision 760). If the user is no longer using the resource (session ended, application closed, etc.), then decision 760 branches to the 'yes' branch to destroy the secure network communications tunnel at 770. On the other hand, if the user is still using the resource, then decision 760 branches to the 'no' branch which loops back to step 720 where the process continues to monitor the user's use of secure network communications tunnel and the requested resource. FIG. 7 processing thereafter returns to the calling routine (see FIG. 6) at 795.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, does not include, and is not to be construed as being, transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving a request from a source device connected to a source network to connect to a selected one of a plurality of destination resources within a destination network;
   in response to verifying that a first connection between the source device and the selected destination resource is allowed:
      establishing a first secure network communications tunnel between the source device and the selected destination resource, wherein the first secure network communications tunnel inhibits the source device from connecting to a different one of the plurality of destination resources within the destination network; and
      terminating the first secure network communications tunnel in response to a detection of a security event.

2. The method of claim 1 further comprising:
detecting a termination of a session established between the source device and the selected destination resource over the secure network communications tunnel, wherein the termination of the session is the security event that results in the termination of the first secure network communications tunnel.

3. The method of claim 1 further comprising:
detecting an intrusion attempt based on an attempted access by the source device to a different one of the plurality of destination resources within the destination network over the first secure network communications tunnel, wherein the intrusion attempt is the security event and results in the termination of the first secure network communications tunnel.

4. The method of claim 1 further comprising:
receiving a set of expected user behaviors corresponding to a user of the source device; and
comparing the set of expected user behaviors to a set of current user behaviors corresponding to the user's use of the selected destination resource over the first secure network communications tunnel, wherein the security event is based on the comparison.

5. The method of claim 1 further comprising:
receiving a set of expected user behaviors corresponding to a user of the source device;
comparing the set of expected user behaviors to a set of current user behaviors corresponding to the user's use of the selected destination resource over the first secure network communications tunnel, wherein the comparison results in a security level;
retrieving a security policy corresponding to the security level; and
triggering a security event in response to the retrieved security policy disallowing access to the selected destination resource.

6. The method of claim 1 further comprising:
receiving a set of expected user behaviors corresponding to a user of the source device;
comparing the set of expected user behaviors to a set of current user behaviors corresponding to the user's use of the selected destination resource over the first secure network communications tunnel; and
disallowing the connection between the source device and the selected destination resource based on the comparison, wherein the disallowing inhibits performance of the establishment of the first secure network communications tunnel.

7. The method of claim 1 further comprising:
receiving a second request from the source device to connect to a different one of the plurality of destination resources within the destination network;
in response to verifying that a second connection between the source device and the different destination resource is allowed:
establishing a second secure network communications tunnel between the source device and the different destination resource, wherein the second secure network communications tunnel is specific to the source device and the different destination resource, and wherein the source device is inhibited from accessing the other destination resources that are connected to the destination network using the second secure network communications tunnel; and
terminating the second secure network communications tunnel in response to a detection of a different security event.

8. An information handling system comprising:
one or more processors;
a memory coupled to at least one of the processors;
a network interface that connects the information handling system to one or more networks; and
a set of computer program instructions stored in the memory and executed by at least one of the processors in order to perform actions comprising:
receiving a request from a source device connected to a source network to connect to a selected one of a plurality of destination resources within a destination network;
in response to verifying that a first connection between the source device and the selected destination resource is allowed:
establishing a first secure network communications tunnel between the source device and the selected destination resource, wherein the first secure network communications tunnel inhibits the source device from connecting to a different one of the plurality of destination resources within the destination network; and
terminating the first secure network communications tunnel in response to a detection of a security event.

9. The information handling system of claim 8 further comprising:
detecting a termination of a session established between the source device and the selected destination resource over the secure network communications tunnel, wherein the termination of the session is the security event that results in the termination of the first secure network communications tunnel.

10. The information handling system of claim 8 further comprising:
detecting an intrusion attempt based on an attempted access by the source device to a different one of the plurality of destination resources within the destination network over the first secure network communications tunnel, wherein the intrusion attempt is the security event and results in the termination of the first secure network communications tunnel.

11. The information handling system of claim 8 further comprising:
receiving a set of expected user behaviors corresponding to a user of the source device; and
comparing the set of expected user behaviors to a set of current user behaviors corresponding to the user's use of the selected destination resource over the first secure network communications tunnel, wherein the security event is based on the comparison.

12. The information handling system of claim 8 further comprising:
receiving a set of expected user behaviors corresponding to a user of the source device;
comparing the set of expected user behaviors to a set of current user behaviors corresponding to the user's use of the selected destination resource over the first secure network communications tunnel, wherein the comparison results in a security level;
retrieving a security policy corresponding to the security level; and
triggering a security event in response to the retrieved security policy disallowing access to the selected destination resource.

13. The information handling system of claim 8 further comprising:
  receiving a set of expected user behaviors corresponding to a user of the source device;
  comparing the set of expected user behaviors to a set of current user behaviors corresponding to the user's use of the selected destination resource over the first secure network communications tunnel; and
  disallowing the connection between the source device and the selected destination resource based on the comparison, wherein the disallowing inhibits performance of the establishment of the first secure network communications tunnel.

14. The information handling system of claim 8 further comprising:
  receiving a second request from the source device to connect to a different one of the plurality of destination resources within the destination network;
  in response to verifying that a second connection between the source device and the different destination resource is allowed:
    establishing a second secure network communications tunnel between the source device and the different destination resource, wherein the second secure network communications tunnel is specific to the source device and the different destination resource, and wherein the source device is inhibited from accessing the other destination resources that are connected to the destination network using the second secure network communications tunnel; and
    terminating the second secure network communications tunnel in response to a detection of a different security event.

15. A computer program product stored in a computer readable storage medium, comprising computer program code that, when executed by an information handling system, performs actions comprising:
  receiving a request from a source device connected to a source network to connect to a selected one of a plurality of destination resources within a destination network;
  in response to verifying that a first connection between the source device and the selected destination resource is allowed:
    establishing a first secure network communications tunnel between the source device and the selected destination resource, wherein the first secure network communications tunnel inhibits the source device from connecting to a different one of the plurality of destination resources within the destination network; and
    terminating the first secure network communications tunnel in response to a detection of a security event.

16. The computer program product of claim 15 further comprising:
  detecting a termination of a session established between the source device and the selected destination resource over the secure network communications tunnel, wherein the termination of the session is the security event that results in the termination of the first secure network communications tunnel.

17. The computer program product of claim 15 further comprising:
  detecting an intrusion attempt based on an attempted access by the source device to a different one of the plurality of destination resources within the destination network over the first secure network communications tunnel, wherein the intrusion attempt is the security event and results in the termination of the first secure network communications tunnel.

18. The computer program product of claim 15 further comprising:
  receiving a set of expected user behaviors corresponding to a user of the source device; and
  comparing the set of expected user behaviors to a set of current user behaviors corresponding to the user's use of the selected destination resource over the first secure network communications tunnel, wherein the security event is based on the comparison.

19. The computer program product of claim 15 further comprising:
  receiving a set of expected user behaviors corresponding to a user of the source device;
  comparing the set of expected user behaviors to a set of current user behaviors corresponding to the user's use of the selected destination resource over the first secure network communications tunnel, wherein the comparison results in a security level;
  retrieving a security policy corresponding to the security level; and
  triggering a security event in response to the retrieved security policy disallowing access to the selected destination resource.

20. The computer program product of claim 15 further comprising:
  receiving a set of expected user behaviors corresponding to a user of the source device;
  comparing the set of expected user behaviors to a set of current user behaviors corresponding to the user's use of the selected destination resource over the first secure network communications tunnel; and
  disallowing the connection between the source device and the selected destination resource based on the comparison, wherein the disallowing inhibits performance of the establishment of the first secure network communications tunnel.

* * * * *